United States Patent [19]

Krummell et al.

[11] Patent Number: 5,180,069
[45] Date of Patent: Jan. 19, 1993

[54] FOUR-DEEP PUSH-BACK WAREHOUSE STORAGE RACK SYSTEM

[75] Inventors: John V. R. Krummell, Irvine; Kenneth E. Davison, Hermosa Beach, both of Calif.

[73] Assignee: Advance Storage Products, Carson, Calif.

[21] Appl. No.: 623,124

[22] Filed: Dec. 6, 1990

[51] Int. Cl.⁵ ............................................. A47F 5/00
[52] U.S. Cl. .................................... 211/151; 211/59.2
[58] Field of Search .............. 211/151, 59.2; 414/276, 414/286

[56] References Cited

U.S. PATENT DOCUMENTS

| | | | |
|---|---|---|---|
| 2,880,024 | 3/1959 | Hewitt | 287/54 |
| 3,038,613 | 6/1962 | Sylvester et al. | 211/162 |
| 3,399,784 | 9/1968 | Buchbinder | 211/151 |
| 3,465,894 | 9/1969 | Setecka | 211/129 |
| 3,567,039 | 3/1971 | Evans | 211/162 |
| 3,744,646 | 7/1973 | Duncan et al. | 211/162 |
| 3,757,967 | 9/1973 | Golbridge | 214/16.4 |
| 4,140,225 | 2/1979 | Hilgers et al. | 211/162 |
| 4,155,462 | 5/1979 | Bendel | 211/151 |
| 4,197,047 | 4/1980 | Haldimann | 414/276 |
| 4,223,279 | 9/1980 | Aspen | 211/162 |
| 4,227,466 | 10/1980 | Rooklyn | 108/93 |
| 4,341,313 | 7/1982 | Döring | 211/151 |
| 4,462,500 | 7/1984 | Konstant et al. | 211/151 |
| 4,613,270 | 7/1986 | Konstant et al. | 211/151 X |
| 4,657,317 | 4/1987 | Gemma | 312/198 |
| 4,687,404 | 8/1987 | Seiz et al. | 414/276 |
| 4,715,765 | 12/1987 | Agnoff | 414/276 |
| 4,738,369 | 4/1988 | Desjardins | 211/113 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 211/151 |

Primary Examiner—Alvin C. Chin-Shue
Assistant Examiner—Sarah A. Lechok
Attorney, Agent, or Firm—Lyon & Lyon

[57] ABSTRACT

A warehouse storage rack organization capable of accommodating pallets arranged in four-deep push-back relation is described in which three carts that move along a single pair of rails permit internested disposition of the carts when they are unloaded, and the sequential movement of load-bearing carts by the imposition via a forklift of subsequent loads on the remaining carts. The organization utilizes only a single pair of rails to achieve the desired result, which rails are formed of conventional structural members whereby the cost of production of the organization is significantly reduced.

11 Claims, 4 Drawing Sheets

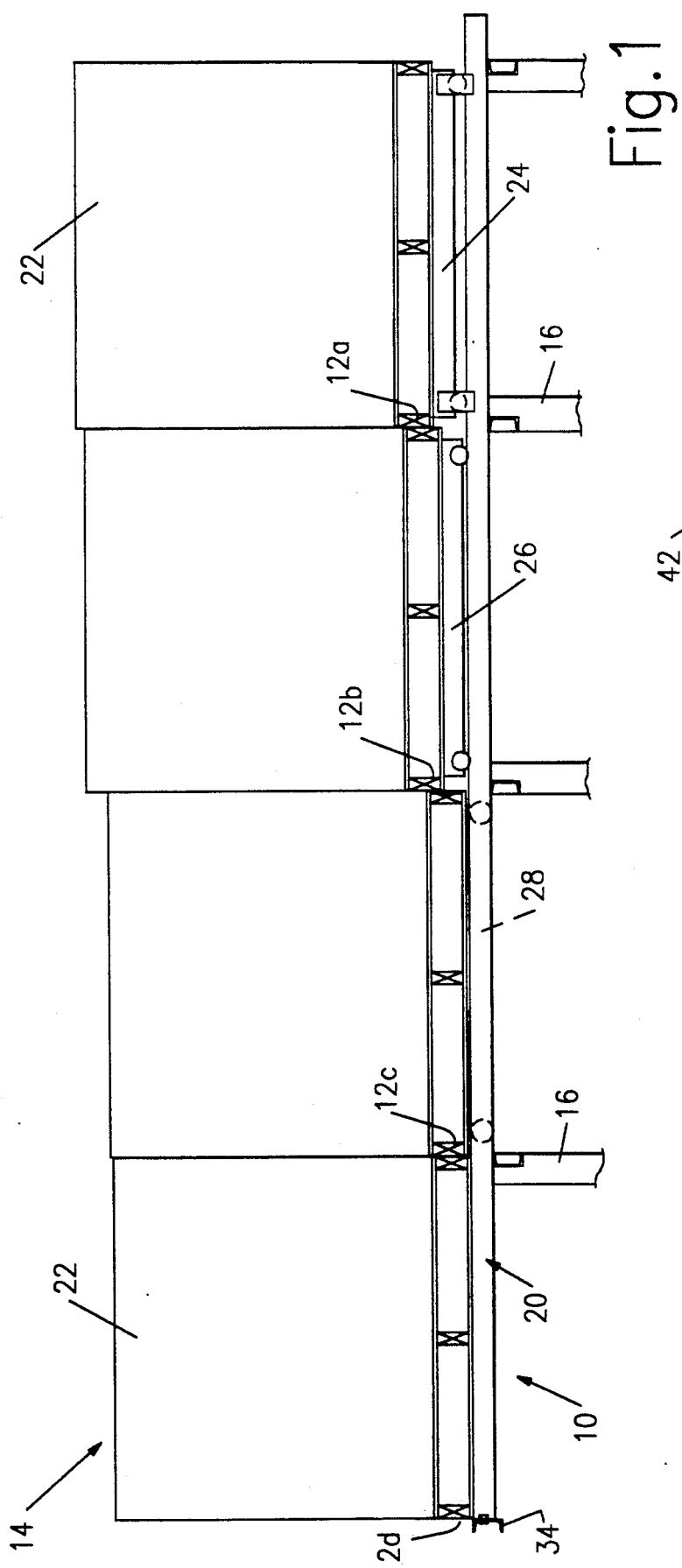
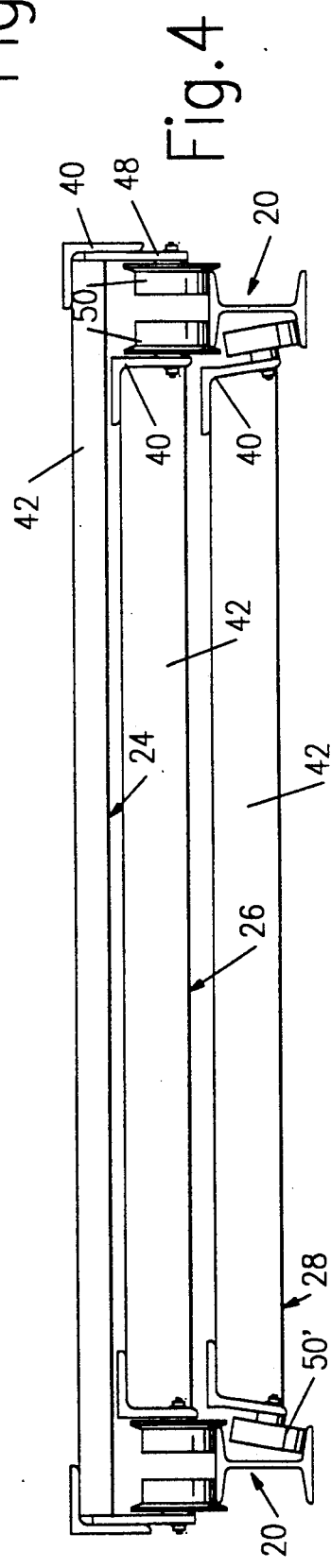
Fig. 1
Fig. 4

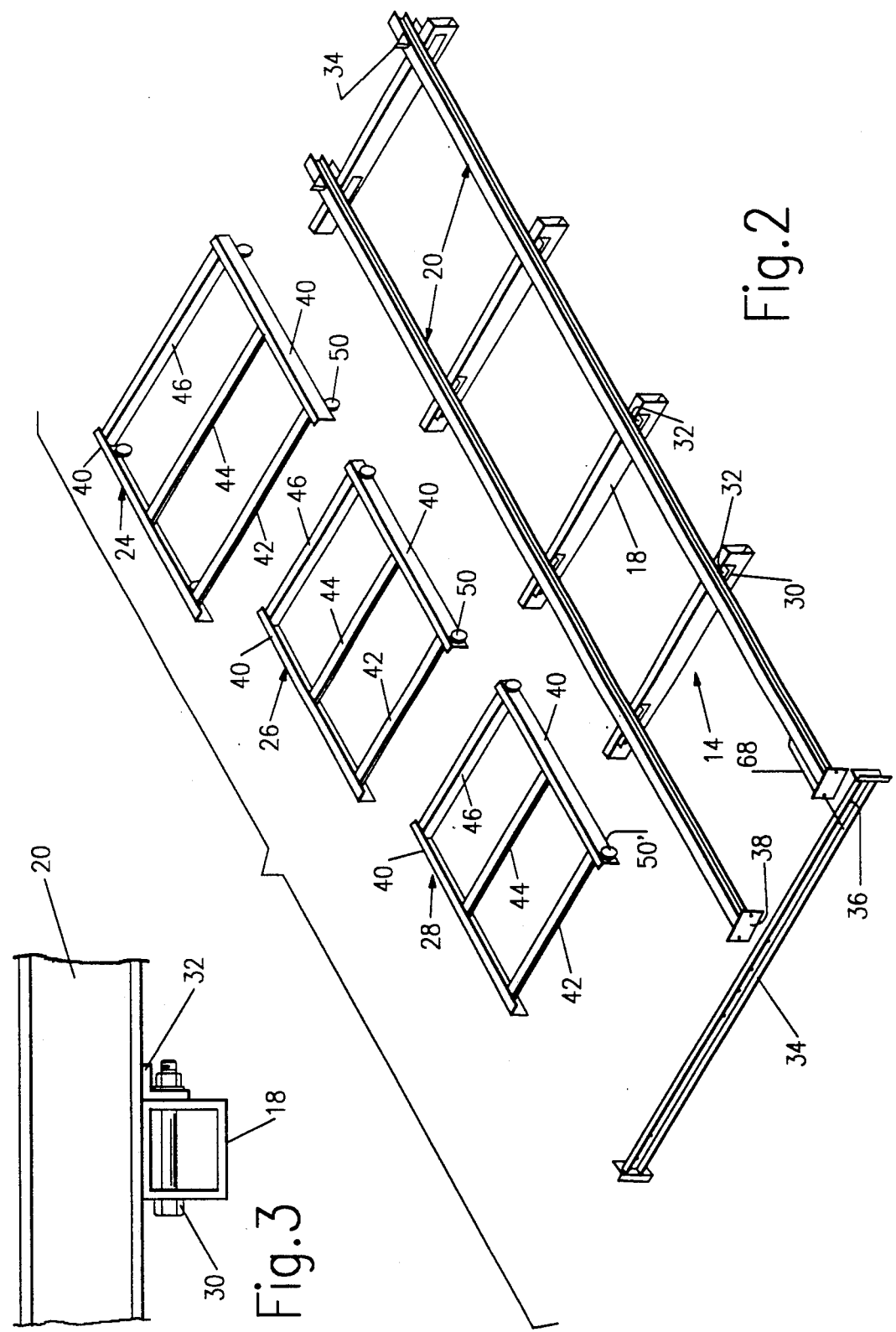

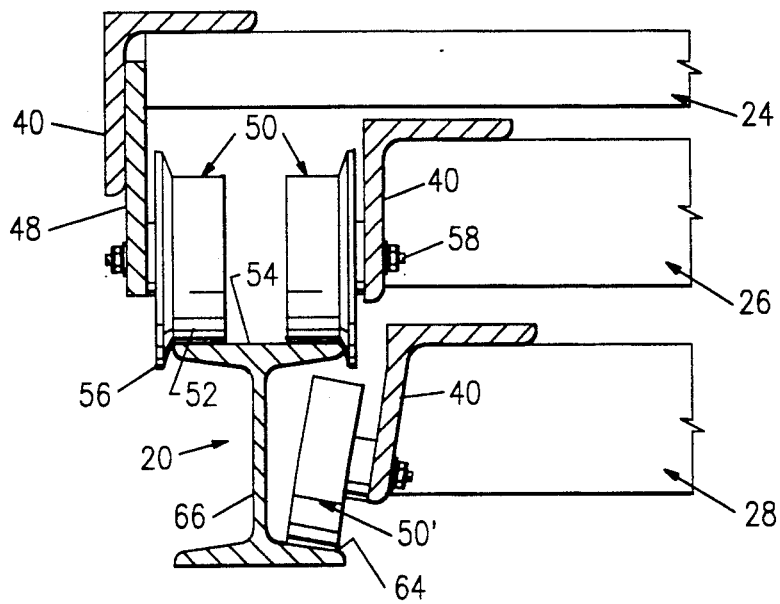
Fig.5
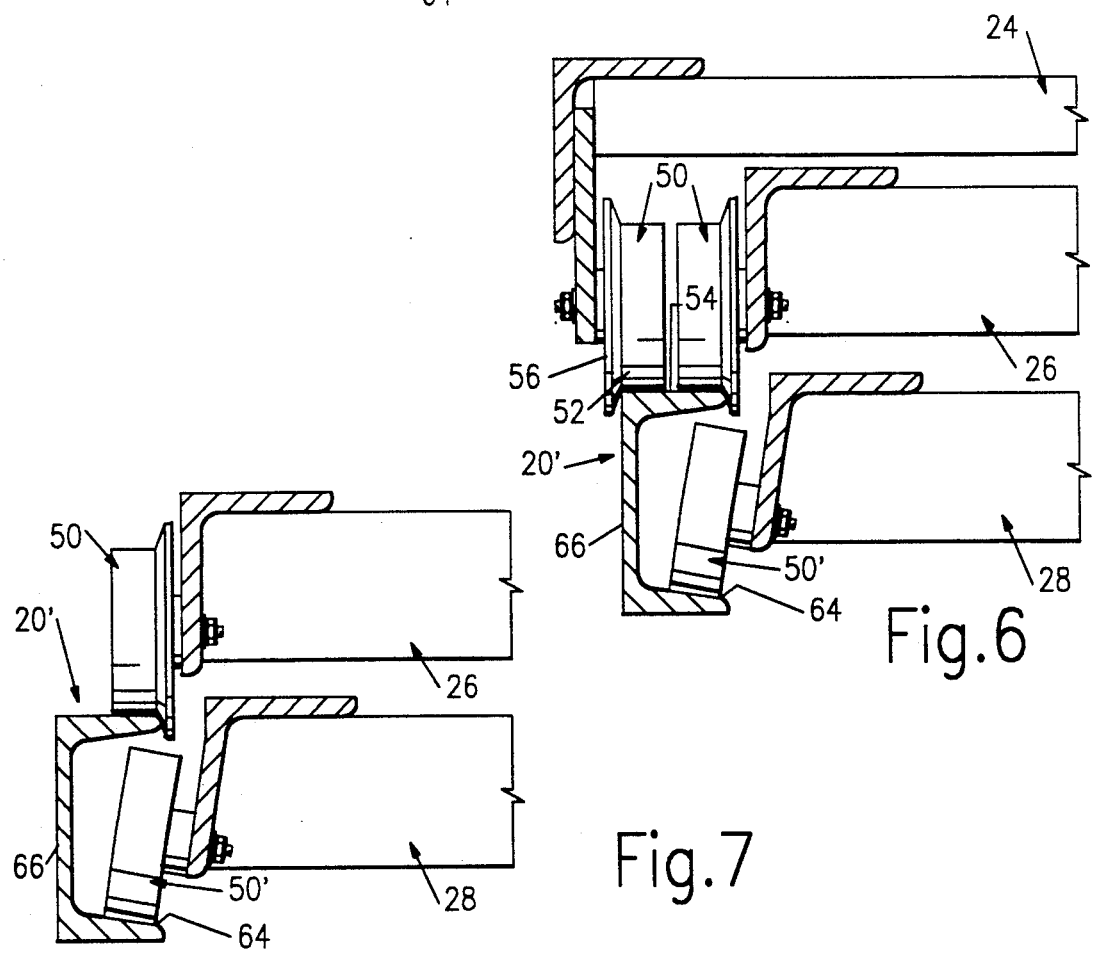
Fig.6
Fig.7

FOUR-DEEP PUSH-BACK WAREHOUSE STORAGE RACK SYSTEM

The present invention relates to warehouse storage racks. More particularly, the invention is directed to warehouse storage rack structures employing mobile carts adapted for the front end reception and delivery of a plurality of loads.

Warehouse storage rack structures of the concerned type heretofore known in the art typically comprise a plurality of horizontally spaced rows of vertically stacked bays in each of which is contained a pair of oppositely spaced rails adapted to receive a number of load-bearing pallets placed end-to-end. It is also known that, in order to expand the load-handling capacity of such bays, nestable wheeled-cart arrangements adapted to roll along the rails can be employed to support the loads in which, for example, a first load is placed upon a first wheeled cart by a forklift followed by a second load which, in being inserted into the bay for placement onto a second wheeled cart, causes the loaded first cart to traverse the rails rearwardly and thereby expose the second cart for reception of the second load. In practice, the rails utilized in such structures are inclined downwardly to the front in order that the loads be urged by gravity to the front end as prior loads are removed. While the number of loads capable of storage in a single bay can vary, depending on the organization of the carts and the rails that form the bay, the last load received in the bay and that assuming a position at the forwardmost end thereof will usually be simply a loaded pallet mounted on the rails.

Although such prior art apparatus may function satisfactorily for their intended purpose, there is a need for improved warehouse storage rack facilities that can be constructed of ordinary, conventional structural members while, at the same time, permitting storage of the maximum volume of goods in each bay. It is to the achievement of such improved facilities, therefore, to which the present invention is directed.

SUMMARY OF THE INVENTION

According to the present invention, therefore, there is provided a warehouse storage rack organization including a plurality of vertically spaced bays, each of the bays being adapted to receive up to four loads, the organization comprising a pair of parallel, oppositely spaced rails formed of structural members having a pair of upwardly facing, generally horizontally extending, vertically spaced upper and lower support surfaces; a plurality of carts arranged for nested reception in the bay including a first cart having wheels movably supported on the lower support surfaces of the oppositely spaced rails and at least a second cart arranged, when nested, to overlie the first cart, and having wheels movably supported on the upper support surfaces of the rails.

The invention contemplates a storage rack arrangement in which the rails can readily accommodate three wheeled carts, and in which the rails may be formed of conventional structural members. Preferably such rails are formed of structural members having either an I- or C- shaped cross section and the carts, which are formed of rectangularly disposed frame members contain means in the form of vertically extending flanges that interact with the frame members of an adjacent cart to provide a limit stop for relative positioning of the nested carts.

It is accordingly a principal object of the invention to provide a warehouse storage rack organization requiring only a single pair of rails on which as many as four pallets can be stored in each bay.

It is another object of the invention to provide a warehouse storage rack organization of the desired type in which the cart-bearing rails comprise conventionally structured members.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 1 is a side elevational view, partly in section of a four-deep warehouse storage rack organization constructed according to the present invention;

FIG. 2 is an exploded perspective view illustrating the principal components of the warehouse storage rack organization of FIG. 1;

FIG. 3 is a side elevational view illustrating a typical rail connected utilized in the warehouse storage rack construction of FIG. 1;

FIG. 4 is a front elevational view of a typical nested assembly of carts employed in the warehouse storage rack organization of FIG. 1;

FIG. 5 is an enlarged sectional elevational view of a nested cart assembly for a warehouse storage rack organization employing rails formed of I-beam structural members;

FIG. 6 is a view similar to FIG. 5 in which the warehouse storage rack organization employs rails formed of C-shaped channel-type structural members;

FIG. 7 is a view similar to FIG. 6 in which the warehouse storage rack is organized for a three-deep pallet arrangement.

DESCRIPTION OF A PREFERRED EMBODIMENT OF THE INVENTION

Figure 8:
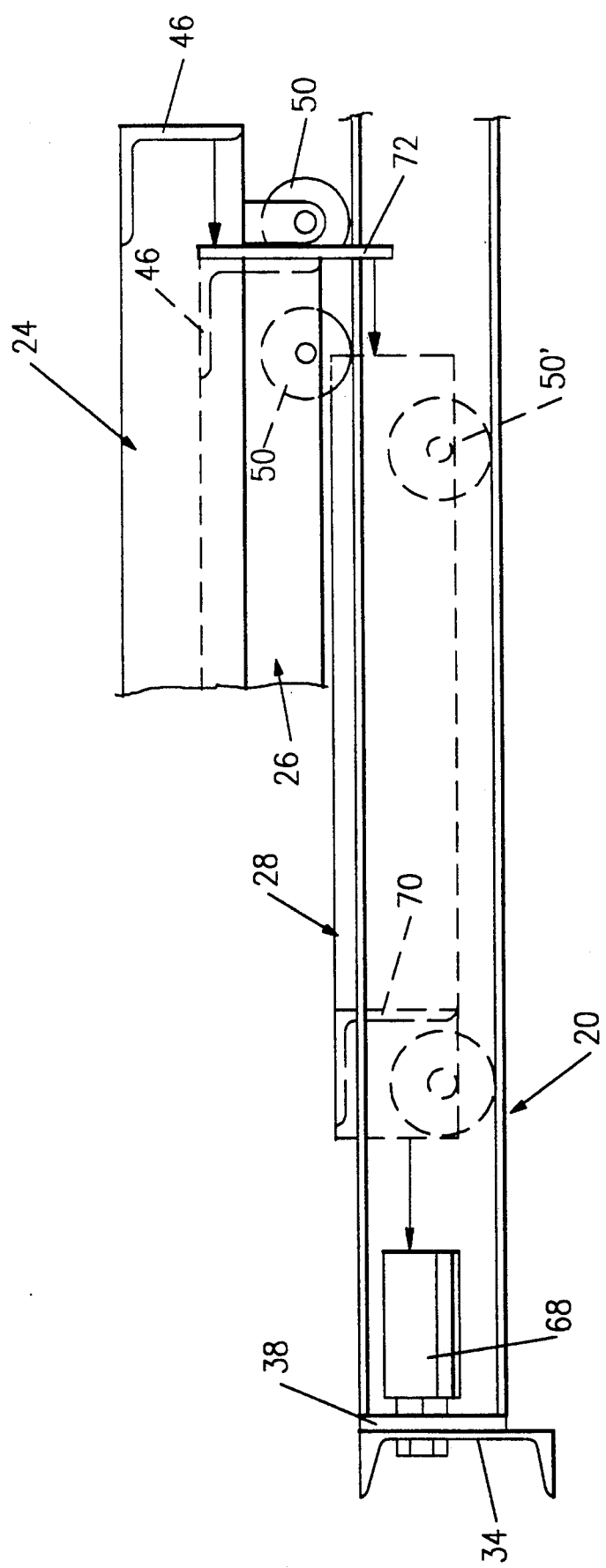
FIG. 8 is a partial side elevational view of the warehouse storage rack organization illustrating various forms of limit stop means for positioning the carts in nested relation.

With reference to the drawings, FIG. 1 illustrates a warehouse storage rack arrangement 10 constructed according to the invention. The illustrated arrangement depicts the invention in its simplest form as only so much of the structural assemblage is shown as is required for accommodating four longitudinally spaced pallets 12a, 12b, 12c and 12d in a single storage bay. It should be understood, however, that warehouse storage rack structures contemplated for commercial application of the invention will incorporate a multiplicity of bays arranged on lateral and vertical spacing.

The illustrated rack structure comprises a plurality of longitudinally spaced uprights 16, between each oppositely spaced pair of which a support member, here shown as a box beam 18, is caused to extend. The support beams 18 mount an oppositely spaced pair of parallel rails 20 that are preferably formed of conventional structural members, either of standard I-shape, as particularly shown in FIGS. 4 and 5, or standard C-shaped channel members, as particularly shown in FIGS. 6 and 7.

In the push-back storage rack organization illustrated in FIGS. 1 and 2, the loads 22 are shown as being mounted on pallets 12a, 12b, 12c and 12d with pallets 12a, 12b and 12c being carried by movable, wheeled carts 24, 26 and 28 and pallet 12d being supported directly on the rails 20. As shown, pallet 12a is located on cart 24 adjacent the back end or innermost portion of the bay 14. Pallet 12b is located on cart 26 disposed outwardly adjacent cart 24. Pallet 12c is located on cart 28 disposed outwardly adjacent cart 26 and, finally, pallet 12d is located outwardly adjacent cart 28 and is disposed directly on the rails 20.

In constructing the storage rack organization 10 the structural members that define the rails 20 are, as shown in FIG. 3, secured to the respective box beams 18, preferably by means of bolted connections 30 between the beams and angle members 32 that are weldedly connected to the rails. At their forward ends, the rails 20 are connected via bolted connections, or the like, to a front cross beam 34 that is shown in FIG. 2 as having sufficient length to accommodate a second similar pair of rails for utilization in a laterally adjacent bay. Connection between the cross beam 34 and the rails 20 is effected by means of elongated bolts arranged to pass through appropriately positioned bolt holes 36 provided in the cross beam and in transverse plates 38 which are welded to the front end of the respective rails. Limit stops formed by angle members 39 welded to the rails 20 prevent excessive inward movement of the rear cart 24.

The arrangement is such that the rails 20 are inclined upwardly from the front end of the bay 14 to the back thereof in order that the carts, when operatively positioned on the rails, will have a gravitationally imposed bias tending to move them toward the front of the bay.

Carts contemplated for use in the invention can be formed of conventional angle, channel or tubular sections. The carts 24, 26 and 28 illustrated in the drawings are of similar construction to the extent that each comprises a plurality of angle members that include a pair of spaced, longitudinally extending side frames 40 and transversely extending lateral frames 42, 44 and 46. Otherwise, the respective carts are constructed somewhat differently in that the rear cart 24, for example, has its wheels 50, which are flanged for reasons hereinafter explained, journalled for rotation in vertically extending wheel-brackets 48 that depend from the side frames 40 thereof and that are designed to elevate the load-bearing platform formed by the angle members such that, as shown in FIG. 4, the cart 24, in its unloaded position, is caused to overlie the middle and front carts, 26 and 28, respectively. Middle cart 26, on the other hand, has its flanged wheels 48 journalled in openings formed directly in the side frames 40 while the front cart 28 utilizes wheels 50 that contain no flanges and that are journalled for rotation on axes that are inclined upwardly in the laterally outward direction.

The present invention contemplates the provision of a four-deep, push-back storage cart system in which only two rails 20 formed of standard structural shapes are required in the construction of each bay 14. Accordingly, as shown in FIGS. 4 and 5 in which the rails 20 are formed by standard I-beam members, the wheels 50 mounted on the rear cart 24 and middle cart 26 are each defined by a cylindrical portion 52 that is placed in rolling engagement with the upwardly facing horizontal surface 54 of the rails and annular flanges 56 that are adapted to engage the opposite side edges of the such surface in order to maintain the carts 24 and 26 in guided, spaced apart relation on the rails. The wheels 50 are essentially standard flanged trolley wheels that possess an internal bearing (not shown) and an axial threaded stud 58 which is adapted to be received in stud holes formed on the side frames 40 of the carts 24 and 26. An annular spacer 60 surrounds the stud between the wheels and the angle flange and a nut 62 threadedly engages the stud 58 for securing these wheels to the cart frames.

The wheels 50', that are mounted on the front cart 28, are secured thereto by mounting apparatus similar to that employed for mounting the wheels 50. The wheels 50' differ from the wheels 50, however, in that they possess no annular rim for cart-guiding purposes. Instead, the wheels 50', being arranged for rolling on the downwardly and laterally inwardly inclined upwardly facing surfaces 64 of the flanges of conventionally-formed I-beam structural members, have their axes of revolution inclined in order that the rolling surfaces of the wheels are parallel to the flange surfaces 64 of the rail-forming beam. By way of the inclined and oppositely facing disposition of the respective surfaces 64, the cart 28 is made to be effectively self-guided along the rails 20. Moreover, as a result of the presence of the upstanding web 66 that separates the I-beam flanges, undesirable lateral movement of the cart 28 is positively prevented.

The warehouse storage rack organization thus far described operates as follows. With the carts empty, the forwardly inclined disposition of the rails 20 causes the carts 24, 26 and 28 to roll under the influence of gravity to the front end of the bay 14 where a limit stop in the form of a rubber cushion 68 engages the forward end of the front cart 28 as, for example, at the downturned flange 70 of the angle forming the transverse frame 42 in order to restrict forward movement of the cart. The cushion 68 is secured via the bolts that connect the front end of the rails 20 to the cross beam 34. As shown in FIG. 8, the cooperative engagement of the depending portion of a plate 72 attached to the back end of the middle cart 26 and that of front cart 28, as well as a similar cooperative engagement between the flange 70 on the angle forming frame 46 on the rear cart 28 and the upper portion of plate 72 causes the three carts to assume an internested disposition at the forward end of the bay 14. When the carts are in an internested disposition, the load-carrying surfaces of the rear cart 24 assume the uppermost position in the organization with those of the middle cart 26 assuming an intermediate position and those of the front cart 28 being lowermost.

With the empty carts being so arranged, the pallet 12a bearing a load 22 is placed upon the loading surface of the rear cart 24 by a forklift (not shown). Thereafter, a second load-bearing pallet 12b is lifted by the forklift to above the level of the load-carrying surface of the middle cart 26 such that, as the pallet is moved inwardly into the bay 14, the load on the pallet 12b engages the load on the pallet 12a on the cart 24 and moves it and the cart in a rearward direction. When the load borne by the forklift is disposed over the load-carrying surface of the cart 26, it is lowered onto the cart. This loading process is repeated with the forklift manipulating a loaded pallet 12c that moves both the carts 24 and 26 toward the rear of the bay 14 prior to its being deposited on the load-carrying surface of the front cart 28. Finally, the forklift raises the pallet 12d containing its load 22 above the prescribed level of the cart 28 and proceeds to push the three carts 24, 26 and 28 further into the bay 14 whereafter the pallet 12d is lowered directly onto the rails 20 and thereby serves to prevent any forward movement of any of the loaded carts.

It will be appreciated that the loaded pallets are removed by essentially reversing the above-described procedure with the forklift, in removing pallet 12d, causing the three carts to roll forwardly until the front cart 28 engages the limit stop cushion 68. Then, when the pallet 12c is removed from the front cart 28, the other two loaded carts move forwardly with middle cart 26 assuming an overlying position with respect to front cart 28 with movement of the former being restricted by engagement of the depending portion of plate 72 with the back end of the front cart. This places pallet 12b on the middle cart 26 at the forward end of the bay where, when it is removed by the forklift, the rear cart 24 assumes its overlying position with respect to the other two carts.

The invention contemplates the use of other conventional structural shapes to form the rails 20. For example, as shown in FIG. 6, a similar warehouse rack organization can be achieved where the I-beam rails 20 of the previously described embodiment are replaced by conventional structural channel members 20'. It should also be appreciated that, as shown in FIG. 7, a foreshortened three-deep version of the invention is effectively and inexpensively attainable by simply employing the two lower carts 26 and 28 on the rails 20'.

Accordingly, a warehouse storage rack organization constructed according to the present invention provides a simple, inexpensive device for achieving a four-deep push-back concept through the utilization of only one pair of rails.

It should be further understood that, although a preferred embodiment of the invention has been illustrated and described herein, changes and modifications can be made in the described arrangement without departing from the scope of the appended claims. For example, where the wheels on the respective carts have been described as being attached for rotation directly to the cart frames, it is obvious that legs depending from the frames can be utilized to rotatably secure the wheels. Also, instead of inclining the axles of the wheels that traverse inclined rail surfaces, wheels having a truncated conical shape that present an inclined surface to the asssociated rail surface can also be employed.

We claim:

1. A warehouse storage rack organization including a plurality of vertically spaced bays, each of said bays being adapted to receive up to four loads, said organization comprising:
   a single pair of parallel, oppositely spaced rails formed of two structural member, each member having an upwardly facing, generally horizontally extending upper support surface, and vertically spaced therefrom an upwardly facing generally horizontally extending lower support surface;
   a plurality of carts arranged for nested reception in said bay, said plurality of carts including a first cart having wheels movably supported on said lower support surfaces of said oppositely spaced rails, a second cart arranged, when nested, to overlie said first cart, said second cart having wheels movably supported on said upper support surfaces of said rails such that said wheels of said second cart are disposed to traverse the inner edge of said upper support surfaces, and a third cart arranged, when nested, to overlie said second cart, said third cart having wheels movably supported on said upper support surfaces of said rails such that said wheels of said third cart are disposed to traverse the outer edge of said upper support surfaces.

2. A warehouse storage rack organization according to claim 2 in which said rails are each formed of structural members having a vertical web and vertically spaced, substantially horizontally disposed flanges extending inwardly from said web.

3. A warehouse storage rack organization according to claim 2 in which said support surface on said upper flange is substantially horizontal in extent and said support surface on said lower flange extends inclinedly downwardly and inwardly from said web.

4. A warehouse storage rack organization according to claim 4 in which said rails are each I-shaped in cross section.

5. A warehouse storage rack organization according to claim 3 in which said rails are each C-shaped in cross section.

6. A warehouse storage rack organization according to claim 3 in which said wheels on a cart disposed to traverse said upper support surface are formed with a generally cylindrical body for rolling reception on said support surface and an enlarged annular flange concentric with said body to guidingly engage the edge of the associated rail.

7. A warehouse storage rack organization according to claim 3 in which said wheels on a cart disposed to traverse said lower support surface are formed with a generally cylindrical body and journalled for rotation about an axis substantially parallel to said lower support surface for rolling reception thereon.

8. A warehouse storage rack organization according to claim 7 in which said lower support surfaces on said rails are inclined downwardly and inwardly.

9. A warehouse storage rack organization according to claim 1 in which said at least second and third carts include limit stop means operative to arrest movement of the overlying cart in the nesting direction.

10. A warehouse storage rack organization according to claim 9 in which said carts include a body comprising rectangularly arranged longitudinally and laterally extending frame members and in which said laterally extending frame members include means for engaging the frame members of the subjcent of said carts to form said limit stop means.

11. A warehouse storage rack organization according to claim 10 in which said limit stop means comprise flange means depending from at least one of said laterally extending frame members into engagement with a subjacent cart.

* * * * *